(12) United States Patent
Jung et al.

(10) Patent No.: US 7,671,616 B2
(45) Date of Patent: Mar. 2, 2010

(54) SEMICONDUCTOR PROBE HAVING EMBOSSED RESISTIVE TIP AND METHOD OF FABRICATING THE SAME

(75) Inventors: Ju-hwan Jung, Yongin-si (KR); Jae-hong Lee, Seoul (KR); Hyung-cheol Shin, Seoul (KR); Jun-soo Kim, Seoul (KR); Seung-bum Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/772,441

(22) Filed: Jul. 2, 2007

(65) Prior Publication Data

US 2008/0094089 A1    Apr. 24, 2008

(30) Foreign Application Priority Data

Oct. 20, 2006    (KR) ...................... 10-2006-0102467

(51) Int. Cl.
*G01R 31/02* (2006.01)
*G01N 23/00* (2006.01)

(52) U.S. Cl. ...................... 324/762; 324/761; 324/757; 250/306; 250/307; 250/308; 250/309

(58) Field of Classification Search ......... 324/754–765; 250/306–311
See application file for complete search history.

(56) References Cited

U.S. PATENT DOCUMENTS 4,668,865 A * 5/1987 Gimzewski et al. ......... 250/306
5,268,571 A * 12/1993 Yamamoto et al. .......... 250/306
5,475,318 A * 12/1995 Marcus et al. .............. 324/762
5,923,033 A * 7/1999 Takayama et al. ........... 250/234
6,028,436 A * 2/2000 Akram et al. ............... 324/755
6,521,921 B2 * 2/2003 Lim et al. ................... 257/255
6,703,258 B2 * 3/2004 Hopson et al. ................ 438/52
7,335,942 B2 * 2/2008 Edinger et al. .............. 257/328

FOREIGN PATENT DOCUMENTS

WO    WO 03/096409    * 11/2003

* cited by examiner

*Primary Examiner*—Ha Tran T Nguyen
*Assistant Examiner*—Karen M Kusumakar
(74) *Attorney, Agent, or Firm*—Sughrue Mion, PLLC

(57) ABSTRACT

A semiconductor probe having an embossed resistive tip and a method of fabricating the semiconductor probe are provided. The semiconductor probe includes a protrusion portion protruded to a predetermined height on a cantilever in a first direction crossing a length direction of the cantilever, an embossed resistive tip formed on the protrusion portion, and first and second semiconductor electrode regions formed at opposite sides of the embossed resistive tip at the protrusion portion, wherein the cantilever is doped with a first dopant, the first and second semiconductor electrode regions and the embossed resistive tip are doped with a second dopant having a different polarity from the first dopant, and the embossed resistive tip is doped with a concentration lower than the first and second semiconductor electrode regions.

8 Claims, 11 Drawing Sheets

SEMICONDUCTOR PROBE HAVING EMBOSSED RESISTIVE TIP AND METHOD OF FABRICATING THE SAME

CROSS-REFERENCE TO RELATED PATENT APPLICATIONS

This application claims priority from Korean Patent Application No. 10-2006-0102467, filed on Oct. 20, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a semiconductor probe having an embossed resistive tip and a method of fabricating the same, and, more particularly, to a semiconductor probe having an embossed resistive tip with a high resolution in both X and Y scanning directions.

2. Description of the Related Art

With the increase in demand for small electronic devices such as mobile communication terminals and personal digital assistants comes the need for ultra small highly integrated recording media. However, since miniaturization of conventional hard disks is not easy, and high integration of a flash memory is also difficult, research has also been conducted on information storage devices using a scanning probe.

A scanning probe is used for various scanning probe microscopy (SPM) techniques. Examples of these are a scanning tunneling microscope (STM) that generates information by detecting a current that flows according to a voltage difference applied between a scanning probe and a specimen, an atomic force microscope (AFM) that uses an atomic force between a scanning probe and a specimen, a magnetic force microscope (MFM) that uses a magnetic force between a magnetic field of a specimen and a magnetized scanning probe, a scanning near-field optical microscope (SNOM) that overcomes the resolution limits of visible light, and an electrostatic force microscope (EFM) that uses an electrostatic charge between a specimen and a scanning probe.

In order to read and write information at high speed and high density using the SPM techniques, the scanning probe must be able to detect the surface charge of regions as small as a few tens of nanometers in diameter. Also, in order to increase the read and write speed, cantilevers must be fabricated in an array.

Figure 1:
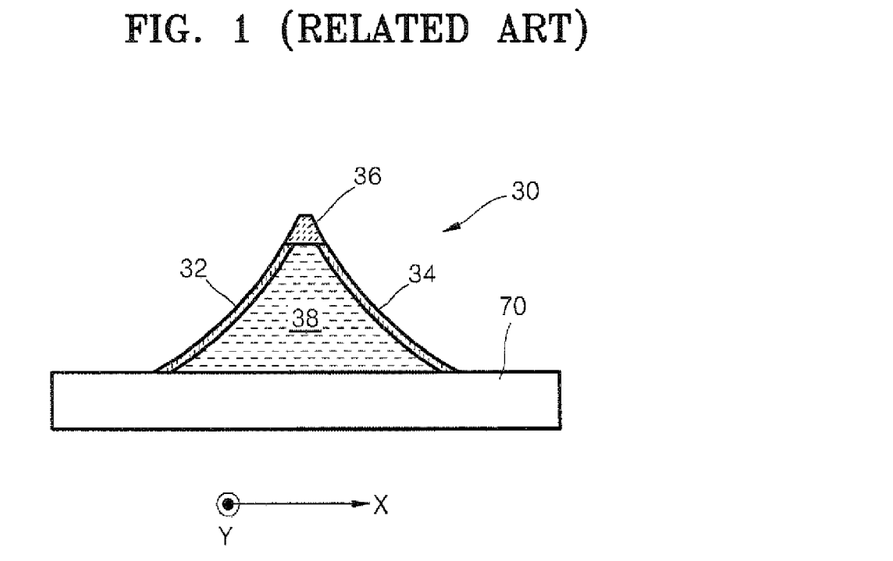
FIG. 1 is a cross-sectional view illustrating a cantilever having a related art resistive tip.

FIG. 1 is a cross-sectional view of a cantilever 70 having a related art resistive tip 30 disclosed in International Patent Publication No. WO 03/096409. The resistive tip 30 is located protruding vertically from the cantilever 70, can be fabricated in an array, and can have a resistance region 36 with a diameter of a few tens of nanometers.

Referring to FIG. 1, the resistive tip 30 of a semiconductor probe includes a main body 38 doped with a first dopant, the resistance region 36 that is located at an end of the resistive tip 30 and is lightly doped with a second dopant, and first and second semiconductor electrode regions 32 and 34 which are located on both side slopes of the main body 38 and are highly doped with the second dopant.

However, in the semiconductor probe having the related art resistive tip 30, the size of the regions of the slopes of the first and second semiconductor electrode regions 32 and 34 doped with high concentration are reduced by excessively etching during a wet etching process or a dry isotropic etching process for forming the resistive tip 30. Accordingly, the conductive regions on the slopes are reduced, and thus, a spatial resolution of the resistance region 36 may be reduced. Also, there is a high possibility the resistive tip 30 can be damaged by the injection of ions with high energies such as 300 keV during a fabrication process and a thermal diffusion process, for example, during annealing at a temperature of 1000° C. for 12 hours which is required. Also, a thermal oxidation process at a temperature of 1000° C. for 30 to 40 minutes under an oxygen atmosphere is required for sharpening the resistive tip 30.

Also, a semiconductor probe having a related art resistive tip has very low resolution in the Y direction compared to that of the X direction.

SUMMARY OF THE INVENTION

The present invention provides a semiconductor probe having high resolution not only in the X direction but also in the Y direction.

The present invention also provides a method of fabricating the semiconductor probe.

According to an aspect of the present invention, there is provided a semiconductor probe having a high resolution embossed resistive tip comprising: a protrusion portion protruded to a predetermined height on a cantilever in a first direction crossing a length direction of the cantilever; an embossed resistive tip formed on the protrusion portion; and first and second semiconductor electrode regions formed at opposite sides of the embossed resistive tip at the protrusion portion, wherein the cantilever is doped with a first dopant, the first and second semiconductor electrode regions and the embossed resistive tip are doped with a second dopant having a different polarity from the first dopant, and the embossed resistive tip is doped with a concentration lower than the first and second semiconductor electrode regions.

The embossed resistive tip may be a rectangular column having a width of 100 nm or less, preferably but not necessarily, a width of 14 to 50 nm.

The semiconductor probe may further comprise first spacers formed on opposite sides of the embossed resistive tip in a second direction crossing perpendicular to the first direction.

The first spacers may comprise an insulating material.

The semiconductor probe may further comprise second spacers on opposite sides of the embossed resistive tip in the first direction.

The second spacers may comprise at least one of an insulating material and a metal.

According to another aspect of the present invention, there is provided a method of fabricating a semiconductor probe having a high resolution embossed resistive tip, comprising: (a) forming a first mask film having a stripe shape in a second direction on an upper surface of a substrate doped with a first dopant; (b) forming an embossed portion having a stripe shape by etching the substrate from above the first mask film; (c) forming first and second semiconductor electrode regions by doping high concentration of a second dopant, which induces a polarity different from the first dopant, on a region of the substrate exposed by the first mask film and forming the embossed portion for a resistance region; (d) forming a photoresist having a stripe shape on the substrate in a first direction perpendicular to the second direction; (e) forming a protrusion portion to a predetermined height on the substrate by removing the first and second semiconductor electrode regions using the photoresist as a second mask film and forming an embossed resistive tip on the protrusion portion; and (f)

forming a cantilever by etching a lower surface of the substrate so that the embossed resistive tip is located on an end portion of the cantilever.

Operation (c) may comprise doping the embossed portion between the first and second semiconductor electrode regions with the second dopant having concentration lower than the first and second semiconductor electrode regions.

The doping of the high concentration of the second dopant in operation (c) may comprise injecting the second dopant into the substrate with an injection energy of 10 keV or less.

Operation (c) may comprise performing thermal annealing on the substrate.

Operation (e) may comprise: forming the embossed resistive tip by removing the embossed portion using the photoresist as the second mask film; depositing an insulating material layer on the substrate and the second mask film; forming first spacers on opposite sides of the embossed resistive tip in the second direction by removing the insulating material layer using an anisotropic etching process from above the substrate; and forming the protrusion portion by removing the first and second semiconductor electrode regions by etching the substrate to a predetermined depth.

Operation (b) may further comprise forming second spacers on opposite sides of the embossed portion in the first direction, and operation (c) may comprise forming the first and second semiconductor electrode regions by doping the region of the substrate exposed by the first mask film and the second spacers with the second dopant having the different polarity from the first dopant, and forming the embossed portion for the resistance region.

The forming of the second spacers may comprise: depositing at least one of an insulating material and a metal on the first mask film and the substrate; and exposing the first mask film and the substrate using an anisotropic etching process from above the substrate.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS

A semiconductor probe having an embossed resistive tip and a method of fabricating the same according to the present invention will now be described more fully with reference to the accompanying drawings in which exemplary embodiments of the invention are shown. In the drawings, the thicknesses of layers and regions are exaggerated for clarity.

Figure 2:
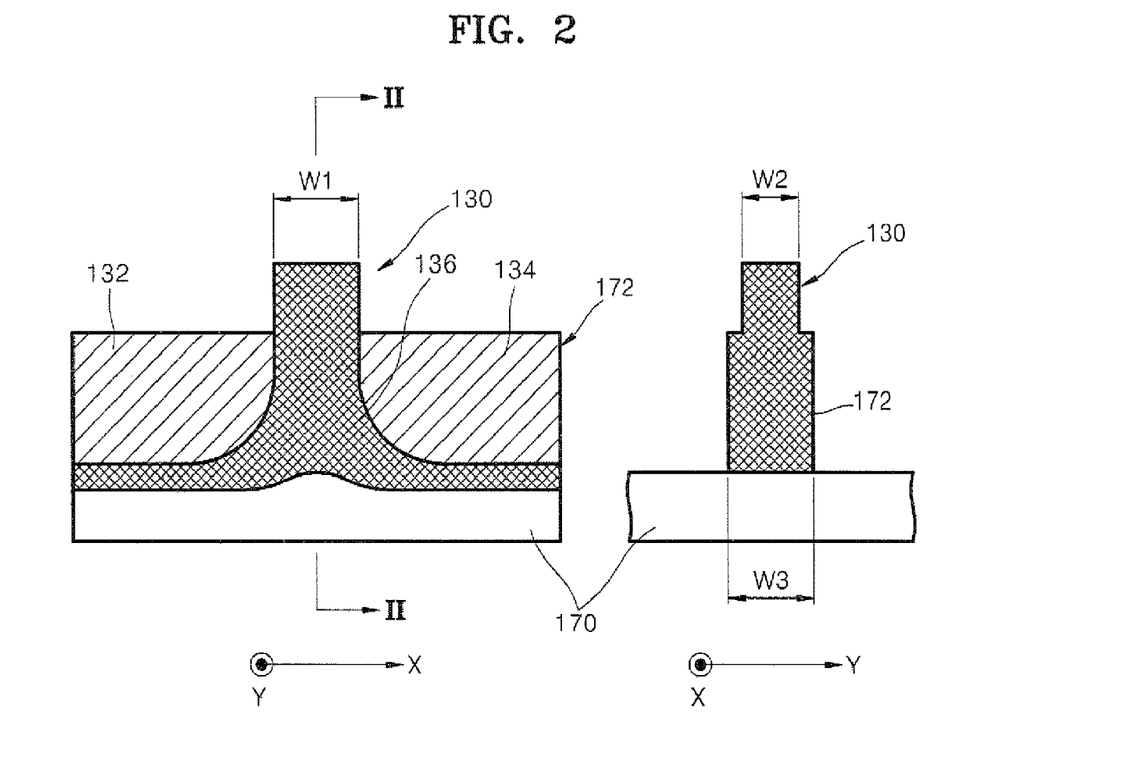
FIG. 2 is a cross-sectional view briefly illustrating a tip portion of a semiconductor probe having an embossed resistive tip according to an exemplary embodiment of the present invention.

FIG. 2 is a cross-sectional view illustrating a tip portion of a semiconductor probe having an embossed resistive tip according to an exemplary embodiment of the present invention. The drawing on the left side is a cross-sectional view taken in the x direction, and the drawing on the right side is a cross-sectional view taken in II-II line of the left side drawing, that is, in the y direction.

Referring to FIG. 2, an embossed unit 172 embossed with a predetermined height, for example, 100 nm formed in a first direction (x direction) crossing the length direction of a cantilever 170 is formed at an end portion of the cantilever 170 doped with a first dopant. At least an upper portion of the embossed unit 172 is a region doped with a second dopant. A resistive tip 130 doped with the second dopant is formed on the embossed unit 172. The resistive tip 130 can be formed as a rectangular column. The resistive tip 130 is a resistance region 136 doped with low concentration of the second dopant. A first electrode region 132 and a second electrode region 134 doped with high concentration of the second dopant are formed on opposite sides of the resistive tip 130 on the cantilever 170. A portion of the cantilever 170 between the first and second electrode regions 132 and 134 and the resistive tip 130 can be formed in a process of injecting ions into the first and second electrode regions 132 and 134. Here, the first dopant may be a p-type dopant and the second dopant may be an n-type dopant.

Widths W1 and W2 of the resistive tip 130 can be controlled by two masks used in the process of fabricating the resistive tip 130. The width W1 corresponds to a width of a first mask, and a width W3 of the embossed unit 172 can be formed to the same width of a second mask. The width W2 can be formed equal to or smaller than the width of the second mask. If the resistive tip 130 has the widths W1 and W2 of 100 nm or less, the ion injection energy for forming the first and second electrode regions 132 and 134 can be reduced to, for example, 10 keV. Therefore, the damage of the semiconductor probe during the ion injection process can be prevented. Also, the conductive regions 132 and 134 formed on opposite sides of the resistive tip 130 covers regions except the resistive tip 130, thereby improving resolution of the semiconductor probe according to an exemplary embodiment of the present invention. The widths W1 and W2 of the resistive tip 130 may be 100 nm or less, preferably but not necessarily, 14 to 50 nm, for realizing a high resolution. When arsenic As is injected with 10 keV, the As has a density distribution in a depth direction. It has been known that a projected range, which is a depth where the density of As is at a maximum, is approximately 10 nm, and the distribution in a horizontal direction from an end of an ion injection mask is about 30 to 40% of the projected range. Therefore, in order to form a resistance region after ion injection and activation annealing processes are performed, the minimum width of the resistive tip 130 may be 1.4 times (14 nm) of the projected range.

Meanwhile, when the semiconductor probe according to an exemplary embodiment of the present invention is scanned in a second direction (y direction) crossing the first direction (x direction), an electric field affects only the embossed resistive tip 130. Therefore, resolution in the second direction increases.

Figure 3:
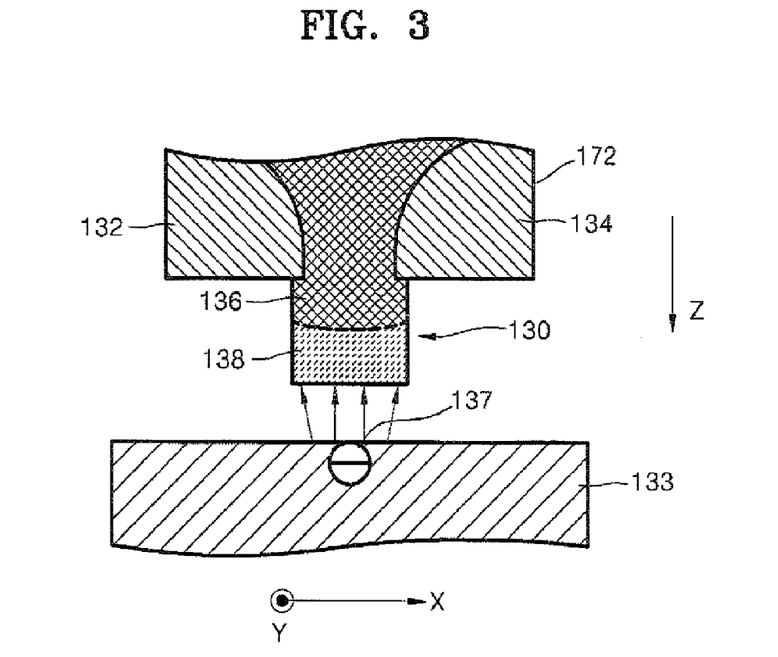
FIG. 3 is a cross-sectional view for explaining the function of the semiconductor probe of FIG. 2, according to an exemplary embodiment of the present invention.

FIG. 3 is an enlarged view of an end portion of the resistive tip 130 of the semiconductor probe of FIG. 2, according to an exemplary embodiment of the present invention.

The operation of the semiconductor probe having an embossed resistive tip according to an exemplary embodiment of the present invention will now be described with reference to FIG. 3.

In the resistive tip 130, when the surface charge 137 of a recording medium 133 is detected, the resistance of the resistance region 136 is changed due to the reduction of the area of the resistance region 136 by a non-conductive depletion region 138, although the non-conductive depletion region 138 is not expanded to the first and second semiconductor electrode regions 132 and 134. Accordingly, the polarity and magnitude of the surface charge 137 of the recording medium 133 can be detected from the variation of the resistance of the resistance region 136. It is seen that the non-conductive depletion region 138 formed in the resistance region 136 gradually expands towards the first and second semiconductor electrode regions 132 and 134 by an electric field generated by the negative surface charge 137. In particular, the resistive tip 130 according to the present invention is differentiated from first and second electrode regions 132 and 134 that act as conductors, thereby improving the spatial resolution of the resistive tip 130.

When the semiconductor probe according to an exemplary embodiment of the present invention is scanned in the x direction, the first and second electrode regions 132 and 134 formed on the protrusion portion 172 define the resistance region 136 so that the negative surface charge 137 of the recording medium 133 can be concentrated on the resistive tip 130. Accordingly, an electric field generated by the negative surface charge 137 (see FIG. 3) of the recording medium 133 changes resistance of the resistive tip 130, and from the resistance changes, the polarity and magnitude of the surface charge 137 are correctly detected.

Also, when the semiconductor probe according to an exemplary embodiment of the present invention is scanned in the y direction, the surface charge 137 is concentrated on the resistive tip 130 of the resistance region 136, thereby improving resolution.

FIGS. 4A through 4H are perspective views illustrating a method of fabricating a semiconductor probe having an embossed resistive tip according to an exemplary embodiment of the present invention.

Figure 4A:
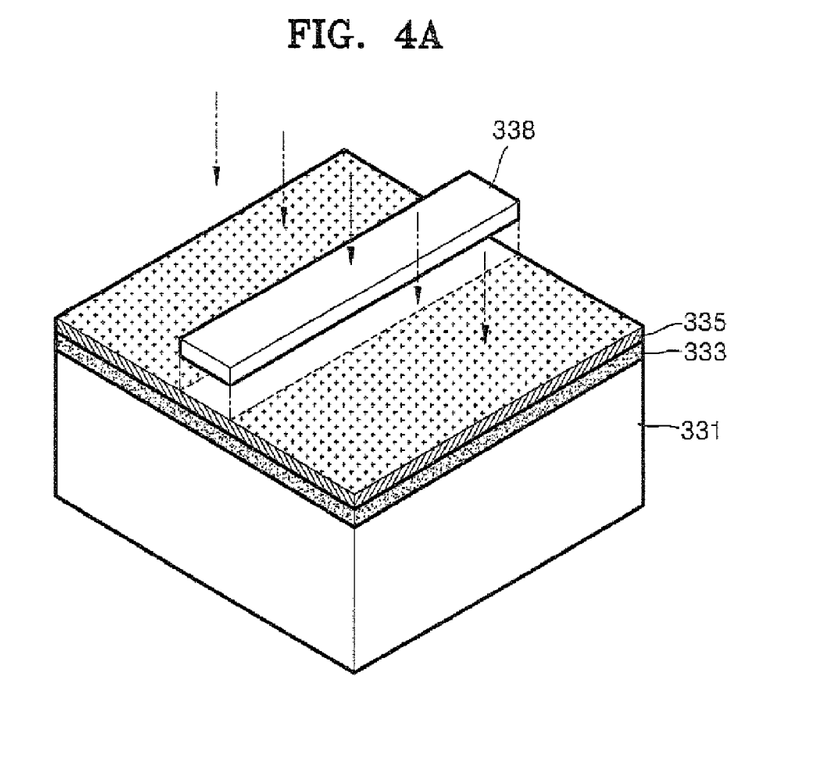
FIGS. 4A through 4I are perspective views sequentially illustrating a method of fabricating a semiconductor probe having an embossed resistive tip according to an exemplary embodiment of the present invention.

Referring to FIG. 4A, a mask film 333 formed of silicon oxide or silicon nitride is formed on the surface of a substrate 331 doped with a first dopant. A photoresist 335 is coated on the mask film 333. Next, a mask 338 having a stripe shape is located over the photoresist 335.

Figure 4B:
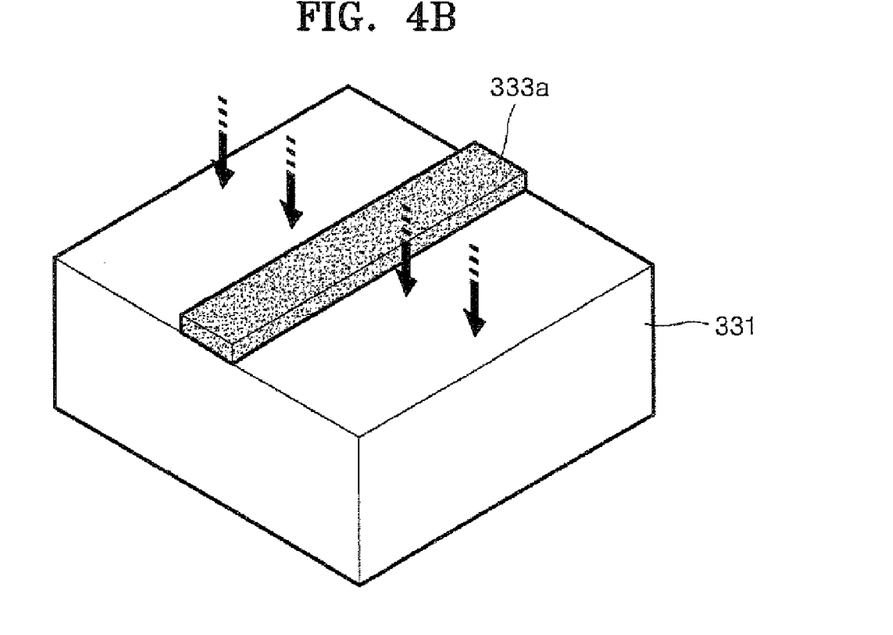

Referring to FIG. 4B, a stripe shaped mask film 333a is formed on the substrate 331 by performing exposure, developing, and etching processes on the mask film 333. The width of the stripe shaped mask film 333a can be approximately 100 nm or less, preferably but not necessarily 14 to 50 nm.

Figure 4C:
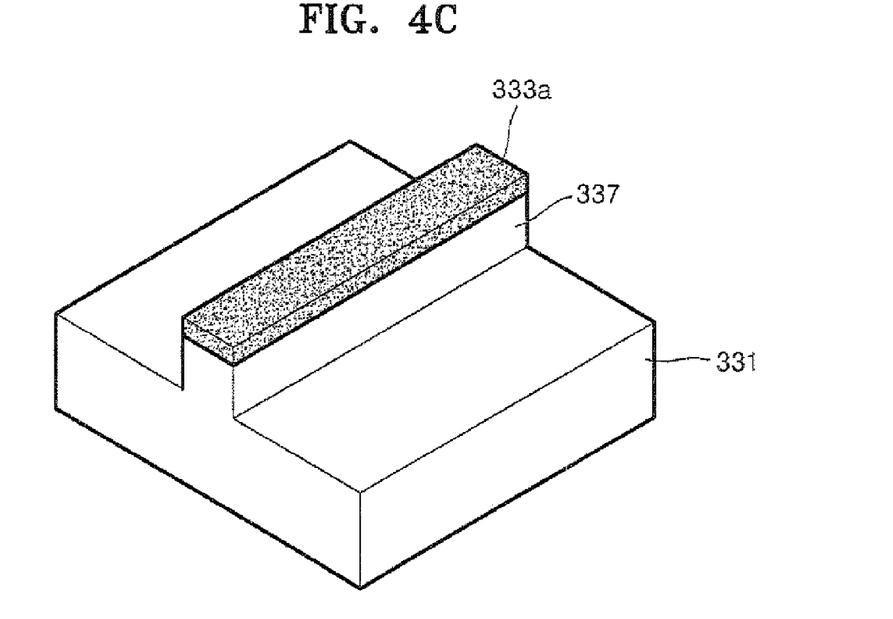

Referring to FIG. 4C, the substrate 331 is etched to a depth of approximately 100 nm by performing a dry etch from above the mask film 333a. Thus, an embossed portion 337 having a stripe shape is formed at the substrate 331.

Figure 4D:
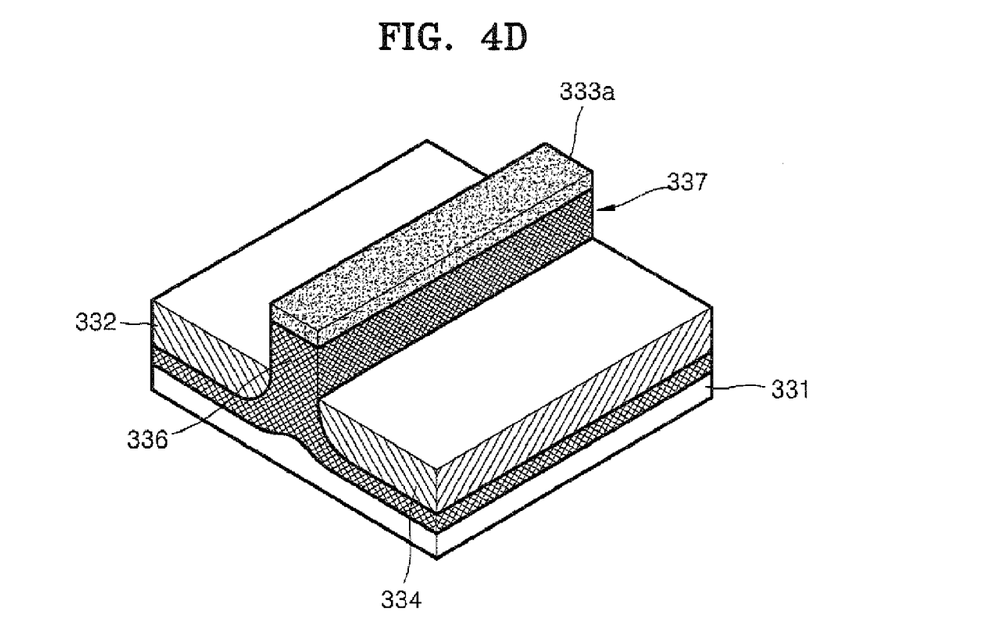

Referring to FIG. 4D, first and second semiconductor electrode regions 332 and 334 are formed by doping high concentration of a second dopant from above the mask film 333a. At this point, a low ion injection energy, for example, 10 keV can be used. The reason why the ion injection energy can be reduced in the present invention is that the first and second semiconductor electrode regions 332 and 334 can be formed thin since there is no process for etching the first and second semiconductor electrode regions 332 and 334 of opposite sides of the resistive tip to form the resistive tip embossed. Also, since the width of the mask film 333a is narrow, a resistance region 336 can be readily formed between the first and second semiconductor electrode regions 332 and 334 by a short ion injection process and a thermal diffusion process. The first and second semiconductor electrode regions 332 and 334 act as conductors due to their low specific resistances. Next, after removing the mask film 333a, the injected ions are activated by rapid thermal annealing (RTA). The RTA process in the present invention is performed for a few minutes at a temperature of 1000° C.

Figure 4E:
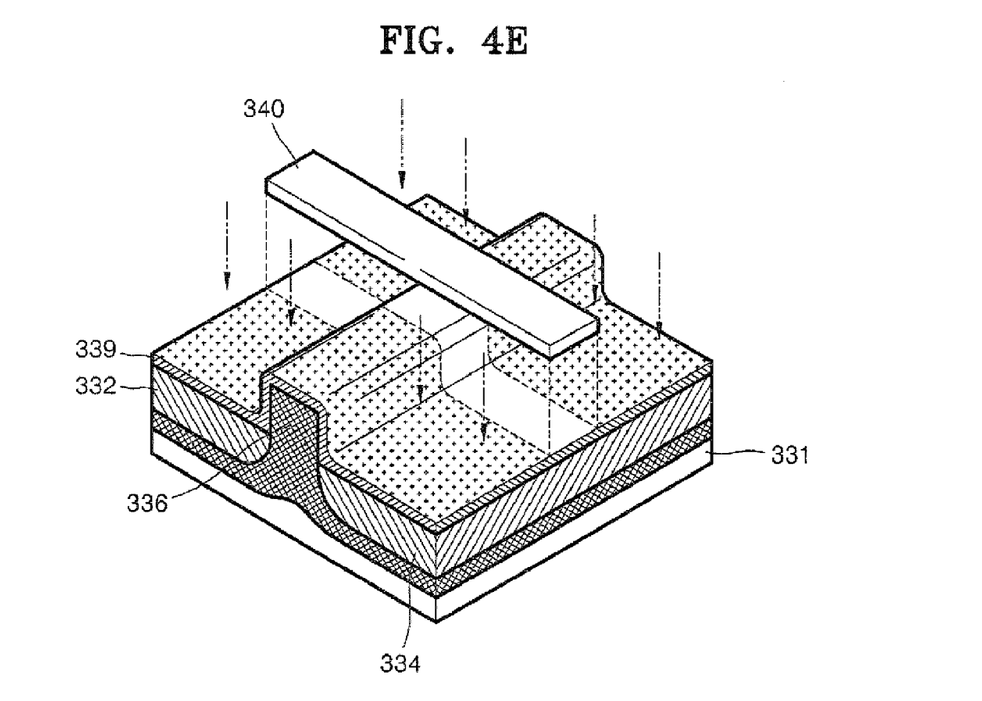

Referring to FIG. 4E, after coating a photoresist 339 on the upper surface of the substrate 331, a photomask 340 having a stripe shape crossing the stripe shaped mask film 333a is located above the photoresist 339.

Figure 4F:
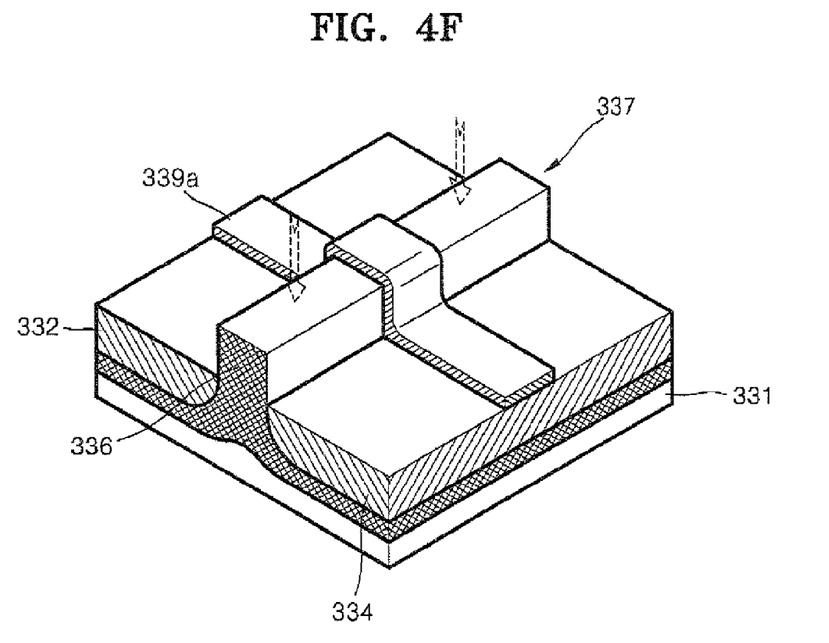

Referring to FIG. 4F, when exposure, developing, and etching processes are performed on the photoresist 339, a photoresist layer 339a having an identical shape to the photomask 340 is formed.

Figure 4G:
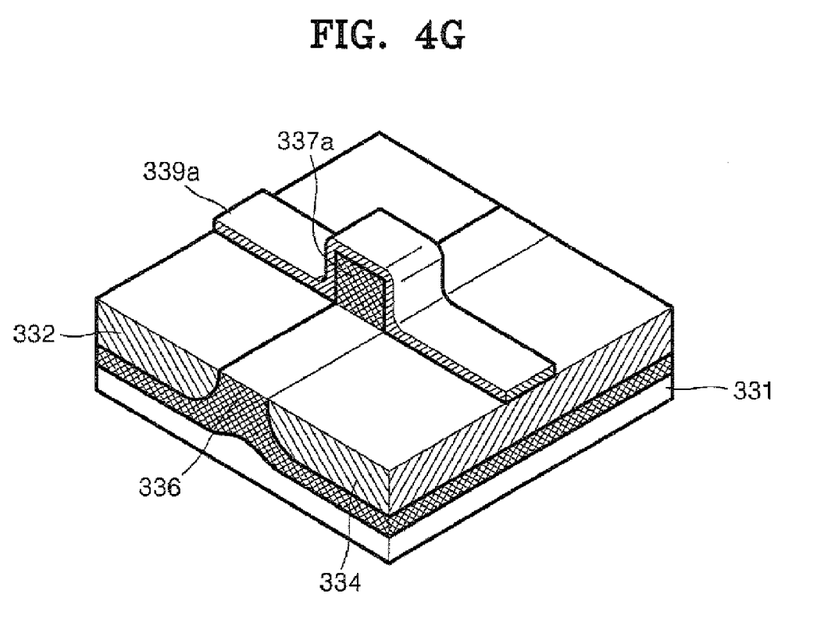

Referring to FIG. 4G, an embossed portion 337a is formed by etching the embossed portion 337 using the photoresist layer 339a having a stripe shape as a mask. At this time, the upper surface of the first and second semiconductor electrode regions 332 and 334 exposed by the stripe shaped mask film 339a is etched, but the etching rate is very slow compared to the embossed unit 337 exposed in three surfaces.

Figure 4H:
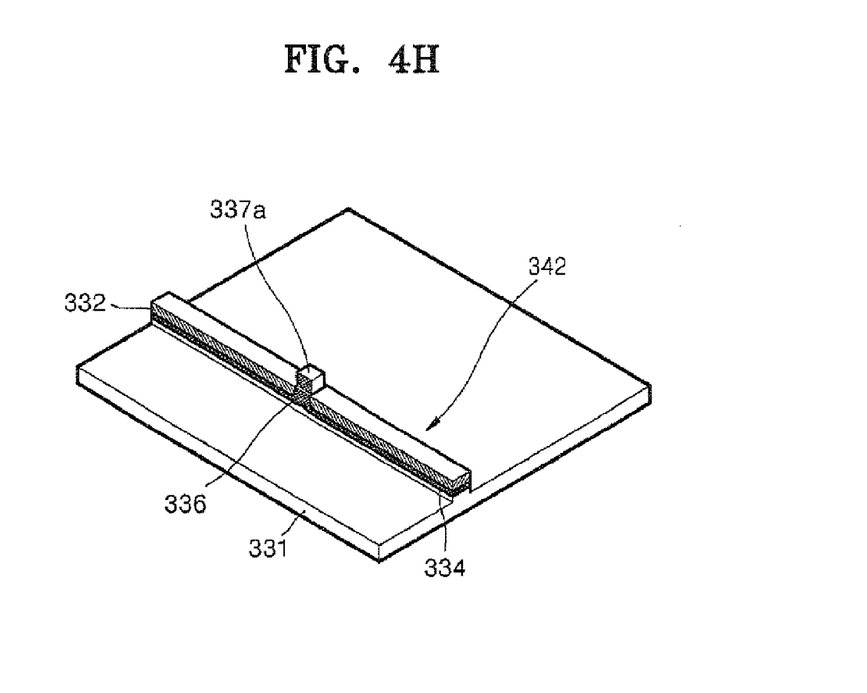

Referring to FIG. 4H, when the substrate 331 exposed through the mask film 339a is further etched so that the first and second semiconductor electrode regions 332 and 334 not covered by the mask film 339a, a protrusion portion 342 is formed on the substrate 331, and the embossed unit 337a is formed on the protrusion portion 340. A portion of side surfaces of the embossed unit 337a not covered by the stripe shaped mask film 339a may be etched.

When the photoresist layer 339a is removed from the substrate 331, the embossed portion 337a having a rectangular column shape is formed on the substrate 331. This embossed portion 337a is the resistive tip according to the present invention.

Figure 4I:
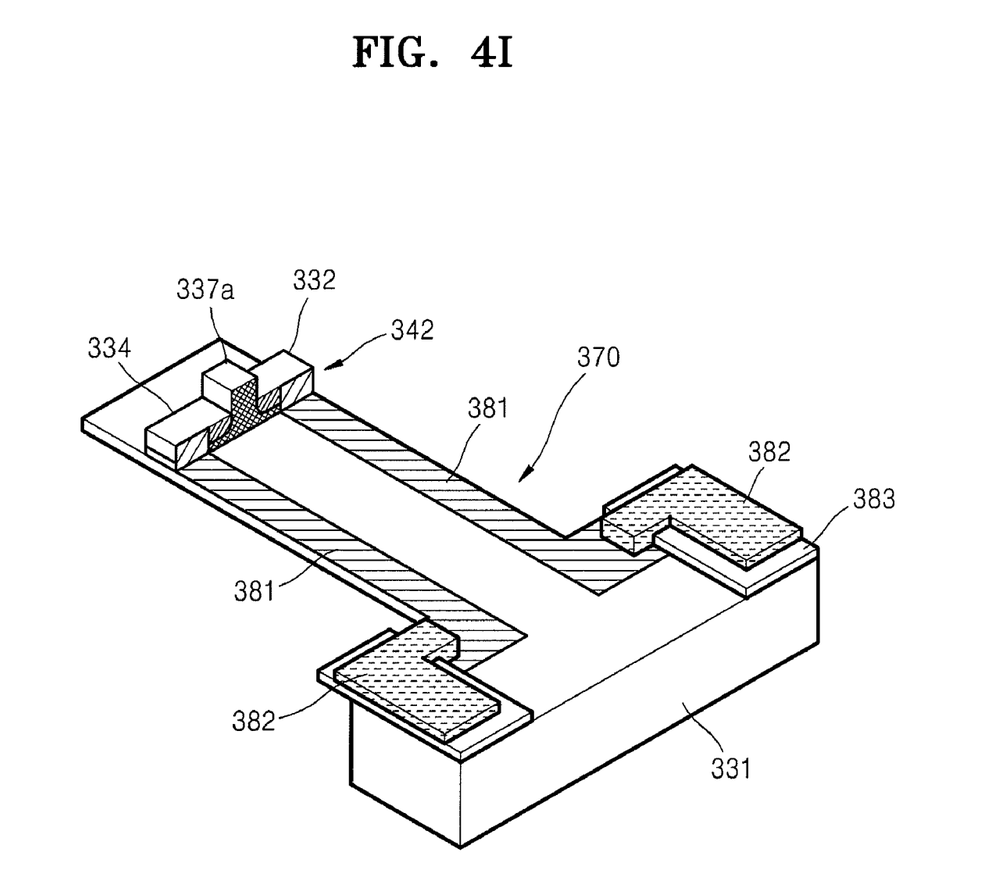

Referring to FIG. 4I, a cantilever 370 is formed by patterning the substrate 331 and etching a lower surface of the substrate 331 so that the resistive tip 337a can be located on an end portion of a surface of the cantilever 370, and a process for connecting conducting lines 381 to the first and second semiconductor electrode regions 332 and 334 is performed. An insulating layer 383 is formed on the substrate 331, and electrode pads 382 are formed on the insulating layer 383 to contact the conducting lines 381. The process of forming the cantilever is well known in the art, and thus, the detailed description is omitted.

Figure 5:
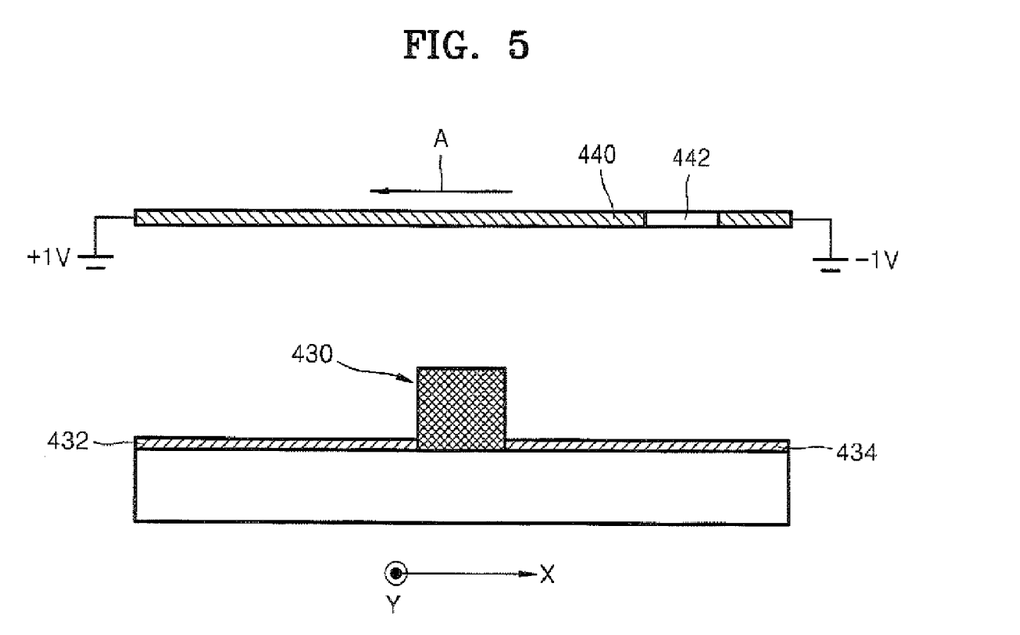
FIG. 5 is an exemplary cross-sectional view of a probe used for a simulation for comparing a resolution of a semiconductor probe according to an embodiment of the present invention and a semiconductor probe in a related art structure.

FIG. 5 is an exemplary cross-sectional view of a probe used for a simulation for comparing a resolution of a semiconductor probe according to an exemplary embodiment of the present invention and a semiconductor probe having a related art structure (a structure in which the mask film 333a is removed in FIG. 4G).

Referring to FIG. 5, source and drain electrodes 432 and 434 are formed on either side in a x direction of a resistive tip 430, and a metal 440 for applying a floating voltage is formed on a location separated 50 nm from the resistive tip 430. The diameter of an opening 442 of the metal 340 is 10 nm. The floating voltages of +1V and −1V were applied to the metal 440. A drain current of the resistive tip 430 was measured while moving the floating voltage in a direction indicated by the arrow A (actually in the y direction). The simulation results are shown in FIG. 6.

Figure 6:
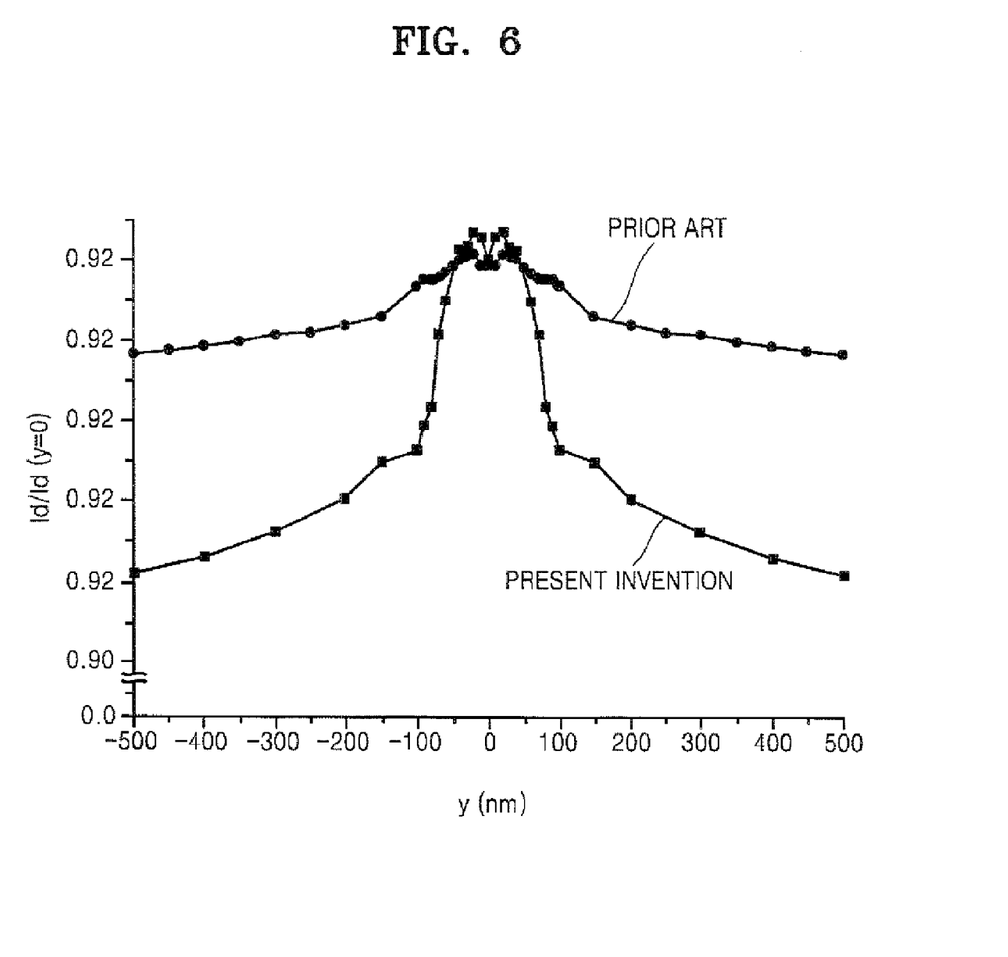
FIG. 6 is a graph showing the result of the simulation of FIG. 5, according to an exemplary embodiment of the present invention.

Referring to FIG. 6, it is seen that the y direction resolution of the semiconductor probe according to an exemplary embodiment of the present invention is greatly improved compared to the resolution when the semiconductor probe in a related art structure is scanned in the y direction.

Figure 7:
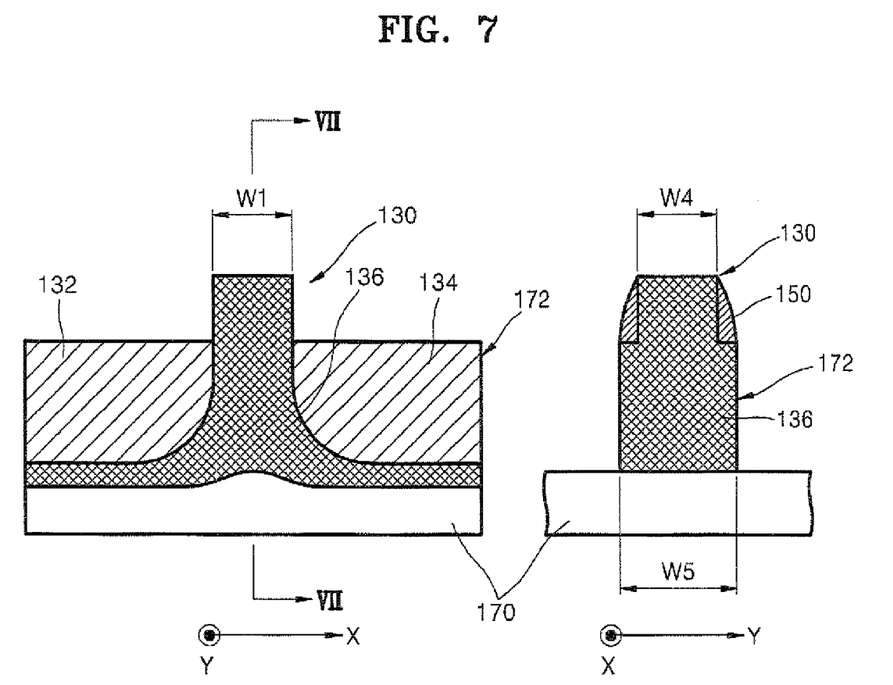
FIG. 7 is a cross-sectional view illustrating a tip portion of a semiconductor probe having an embossed resistive tip according to another exemplary embodiment of the present invention.

FIG. 7 is a cross-sectional view illustrating a tip portion of a semiconductor probe having an embossed resistive tip according to another exemplary embodiment of the present invention. The drawing on the left side is a cross-sectional view taken in the x direction, and the drawing on the right side is a VII-VII line of the left side drawing, that is, in the y direction. Like reference numerals are used to indicate elements that are substantially identical to the elements of FIG. 2, and thus the detailed description thereof will not be repeated.

Referring to FIG. 7, spacers 150 are formed on opposite sides of a resistive tip 130 in a second direction (y direction) of a cantilever 170. The width W4 of the resistive tip 130 between the spacers 150 is formed narrower than the width W5 of the protrusion portion 172. The spacers 150 prevent the resistive tip 130 from being etched in an y direction during an etching process, and are formed of an insulating material. The insulating material can be a material generally used in semiconductor processes.

The semiconductor probe according to the present exemplary embodiment of the present invention also has improved resolution in the y direction as the same as the semiconductor probe of FIG. 2, and the detailed description will be omitted.

A method of fabricating a semiconductor probe according to the present exemplary embodiment of the present invention will now be described.

Figure 8A:
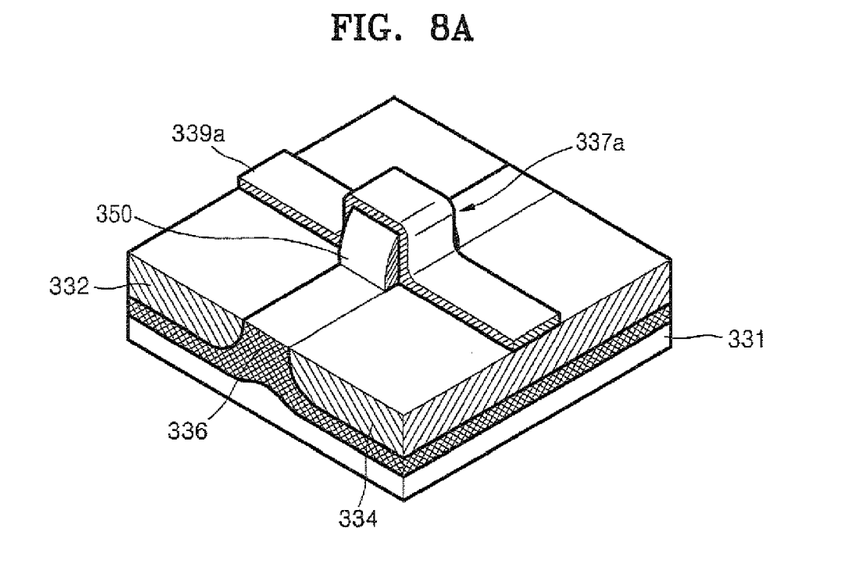
FIGS. 8A and 8B are perspective views illustrating a method of fabricating a semiconductor probe having an embossed resistive tip of FIG. 7, according to an exemplary embodiment of the present invention.

The operations shown in FIGS. 4A through 4G can also be used for the method of fabricating a semiconductor probe according the present exemplary embodiment. Referring to FIG. 8A, an insulating material (not shown) is deposited on the resultant product of FIG. 4G. Next, when the insulating material is anisotropically etched from above the substrate 331, spacers 350 formed of the insulating material are formed on opposite sides of an embossed portion 337a.

Figure 8B:
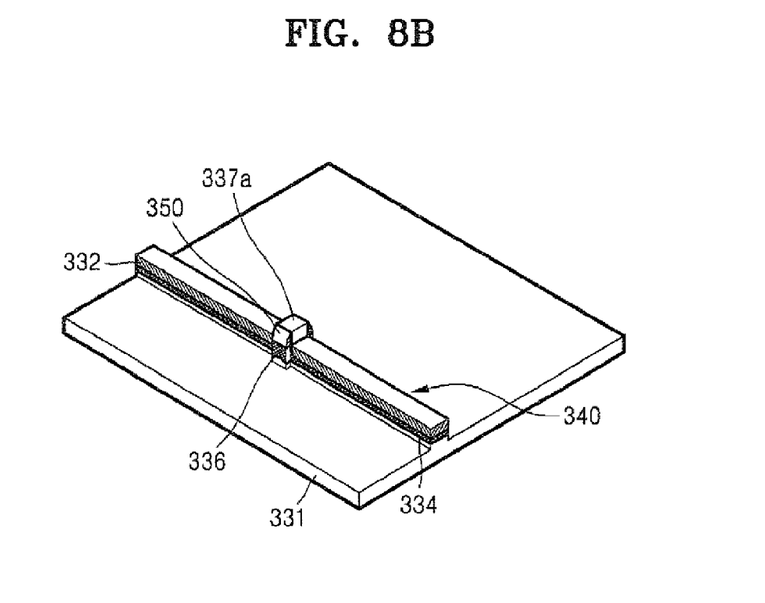

Referring to FIG. 8B, when the substrate 331 exposed by a mask film 339a and the spacers 350 are further etched, a protrusion portion 340 is formed on the substrate 331 and a resistive tip 337a is formed on the embossed unit 340. When the mask film 339a is removed from the substrate 331, the resistive tip 337a having a rectangular column shape is formed on the substrate 331.

Next, a cantilever (not shown) is formed by etching a lower surface of the substrate 331 so that the resistive tip 337a can be located on an end portion of a surface of the cantilever, and a process for connecting an electrode pad (not shown) to the first and second semiconductor electrode regions 332 and 334 is performed. The process of forming the cantilever is well known in the art, and thus, the detailed description is omitted.

Figure 9:
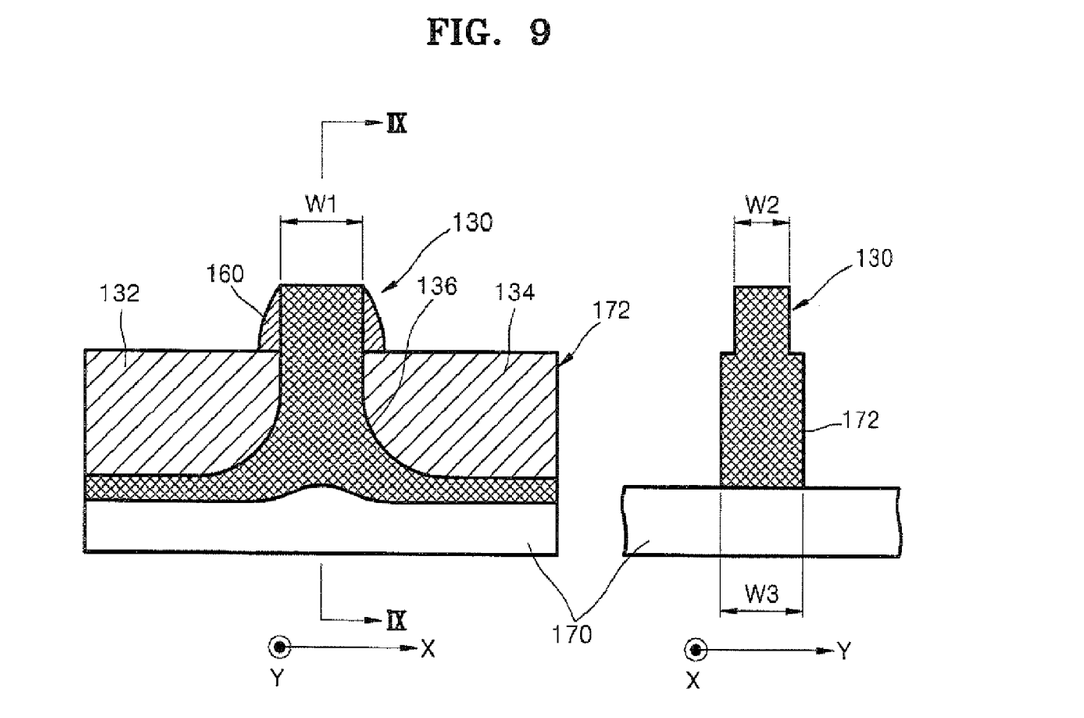
FIG. 9 is a cross-sectional view illustrating a tip portion of a semiconductor probe having an embossed resistive tip according to still another exemplary embodiment of the present invention.

FIG. 9 is a cross-sectional view illustrating a tip portion of a semiconductor probe having an embossed resistive tip according to still another exemplary embodiment of the present invention. The drawing on the left side is an cross-sectional view taken in the x direction, and the drawing on the right side is an IX-IX line of the left side drawing, that is, in the y direction. Like reference numerals are used to indicate elements that are substantially identical to the elements of FIG. 2, and thus the detailed description thereof will not be repeated.

Referring to FIG. 9, spacers 160 are formed on opposite sides of a resistive tip 130 in a first direction (x direction) of a cantilever 170. When the width of the mask film 333a is narrow, a gap between first and second semiconductor electrode regions 132 and 134 can be reduced during a doping process of FIG. 4D. Therefore, the purpose of the spacers 160 is to prevent the occurrence of a short cut at the resistance region 136 due to the reduced gap between first and second semiconductor electrode regions 132 and 134. The spacers 160 can be formed of an insulating material or a metal such as Al, Ti, W, Sn, Cu, or Cr.

A method of fabricating a semiconductor probe according to still another exemplary embodiment of the present invention will now be described.

Figure 10:
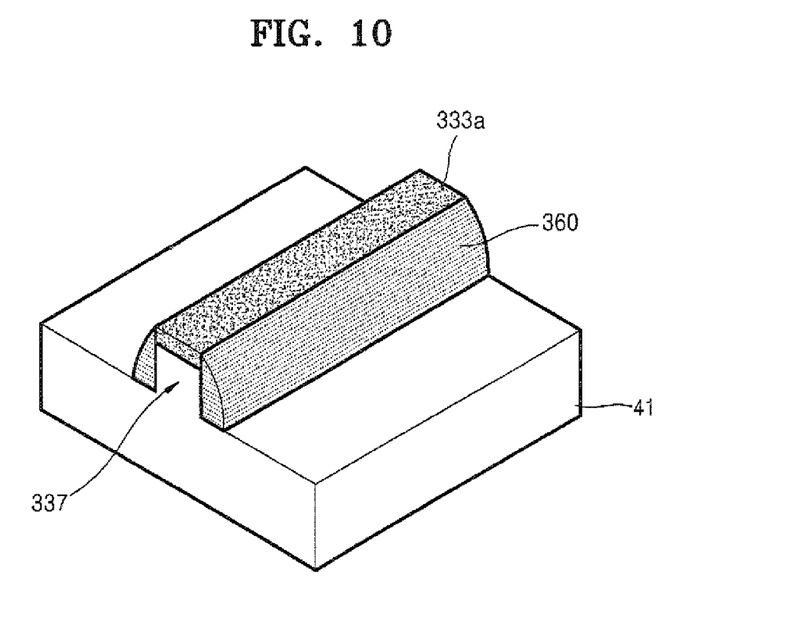
FIG. 10 is a perspective view illustrating a method of fabricating a semiconductor probe having an embossed resistive of FIG. 9, according to an exemplary embodiment of the present invention.

The operations shown in FIGS. 4A through 4C can be used for the method of fabricating a semiconductor probe according the present exemplary embodiment. Referring to FIG. 10, an insulating material or a metal is deposited on the resultant product of FIG. 4C. Next, when the insulating material or the metal is anisotropically etched, spacers 360 are formed on opposite sides of an embossed portion 337. Subsequent processes are the same as the operation described with reference to FIGS. 4D through 4H, and thus, the detailed descriptions are not repeated.

Figure 11:
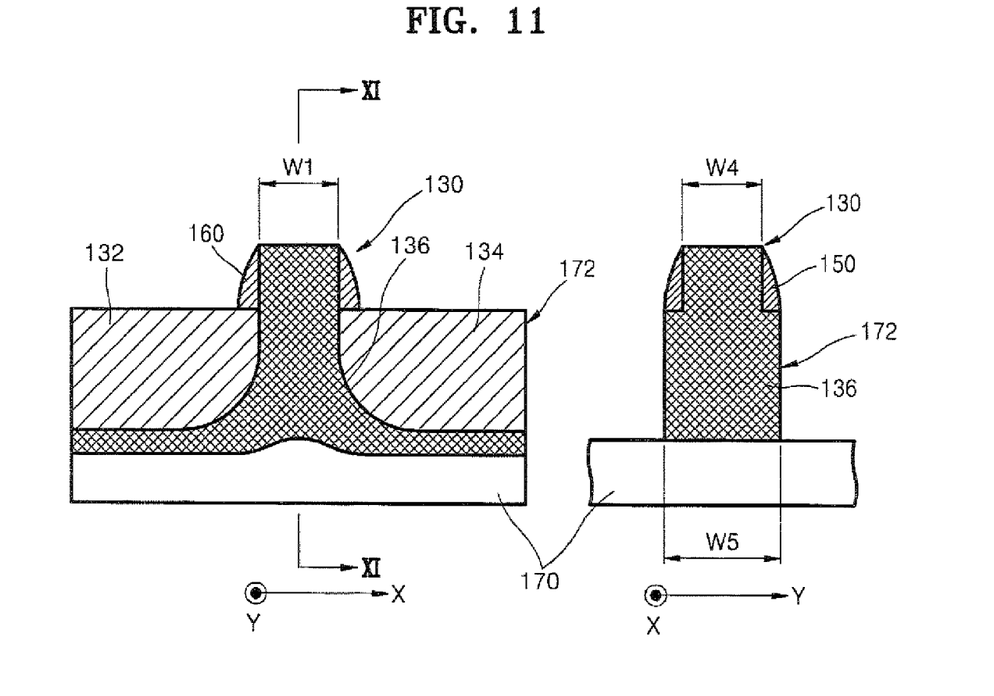
FIG. 11 is a cross-sectional view illustrating a method of fabricating a semiconductor probe having an embossed resistive tip according to still further another exemplary embodiment of the present invention.

FIG. 11 is a cross-sectional view illustrating a tip portion of a semiconductor probe having an embossed resistive tip according to still further another exemplary embodiment of the present invention. The drawing on the left side is a cross-sectional view taken in the x direction, and the drawing on the right side is a cross-sectional view taken in an XI-XI line of the left side drawing, that is, in the y direction. Like reference numerals are used to indicate elements that are substantially identical to the elements of FIG. 2, and thus the detailed description thereof will not be repeated.

Referring to FIG. 11, first spacers 150 are formed on opposite sides of a resistive tip 130 in a second direction (y direction) of a cantilever 170, and second spacers 160 are formed on opposite sides of the resistive tip 130 in a first direction (x direction) of the cantilever 170.

The first spacers 150 prevent the resistive tip 130 from being etched in the y direction during an etching process. The first spacers 150 can be formed of an insulating material. There are no specific limitations for selecting the insulating material, and the spacers 150 can be formed of a material generally used in the semiconductor processes.

When the width of the stripe shaped mask film 333a is narrow, a gap between first and second semiconductor electrode regions 332 and 334 can be reduced during a doping process of FIG. 4D. Therefore, the purpose of the spacers 160 is to prevent the occurrence of a shortcut at the resistance region 136 due to the reduced gap between the first and second semiconductor electrode regions 132 and 134. The second spacers 160 can be formed of an insulating material or a metal such as Al, Ti, W, Sn, Cu, or Cr.

A method of fabricating a semiconductor probe according to still further another exemplary embodiment of the present invention can be understood from the methods of fabricating a semiconductor probe described with reference to FIGS. 7 and 9, and thus, the detailed description thereof will not be repeated.

In the semiconductor probe having an embossed resistive tip according to the present invention, since the resistive tip is formed on a protrusion portion and electrode regions are removed from a substrate except for the electrode regions on which the protrusion portion is formed, resolutions not only in an x direction but also in a y direction are improved.

In a method of fabricating a semiconductor probe having an embossed resistive tip according to the present invention, the damage of the semiconductor probe can be prevented since a low energy is used in an ion injection process. Also, a desired semiconductor probe can be readily fabricated since the method does not include a related art long hour ion diffusion process which is difficult to control.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor probe having a high resolution embossed resistive tip comprising:
   a protrusion portion protruded on a cantilever to a predetermined height, wherein a top surface of the protrusion portion is parallel to a surface of the cantilever;
   an embossed resistive tip formed on the protrusion portion; and
   first and second semiconductor electrode regions formed at opposite sides of the embossed resistive tip at the protrusion portion,
   wherein the cantilever is doped with a first dopant, the first and second semiconductor electrode regions and the embossed resistive tip are doped with a second dopant having a different polarity from the first dopant, and the embossed resistive tip is doped with a concentration lower than the first and second semiconductor electrode regions,
   wherein the embossed resistive tip is a rectangular column having a width of 100 nm or less, and
   wherein the embossed resistive tip is not doped with the first dopant.

2. The semiconductor probe of claim 1, wherein the embossed resistive tip has a width of 14 to 50 nm.

3. The semiconductor probe of claim 1, further comprising first spacers formed on opposite sides of the embossed resistive tip in a length direction of the cantilever.

4. The semiconductor probe of claim 3, wherein the first spacers comprise an insulating material.

5. The semiconductor probe of claim 3, further comprising second spacers on opposite sides of the embossed resistive tip in a direction perpendicular to the length direction of the cantilever.

6. The semiconductor probe of claim 5, wherein the second spacers comprise at least one of an insulating material and a metal.

7. The semiconductor probe of claim 1, further comprising spacers on opposite sides of the embossed resistive tip in a direction perpendicular to the length direction of the cantilever.

8. The semiconductor probe of claim 7, wherein the spacers comprise at least one of an insulating material and a metal.

* * * * *